April 28, 1959          D. L. JAYET          2,883,919
FLUIDTIGHT CASING FOR VIEW-TAKING CAMERAS
Filed Aug. 18, 1954          2 Sheets-Sheet 1
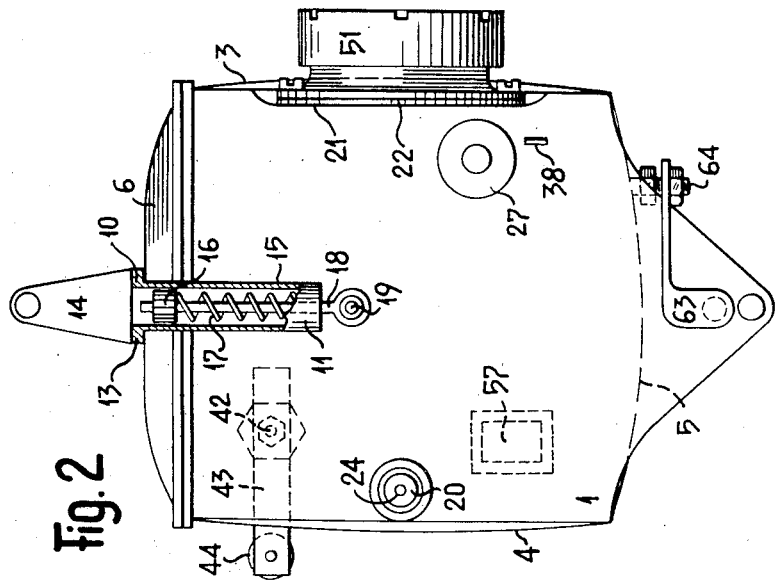
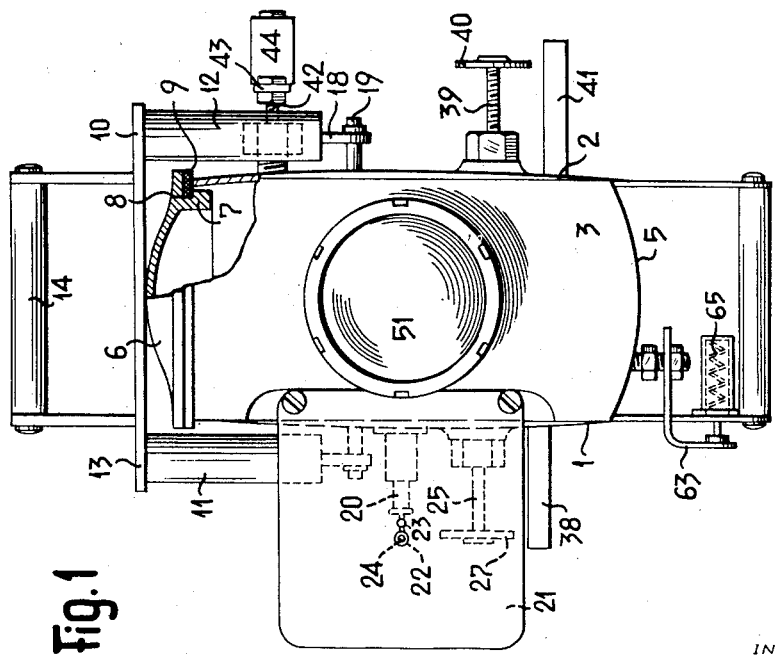
INVENTOR
David L. Jayet.
ATTORNEY

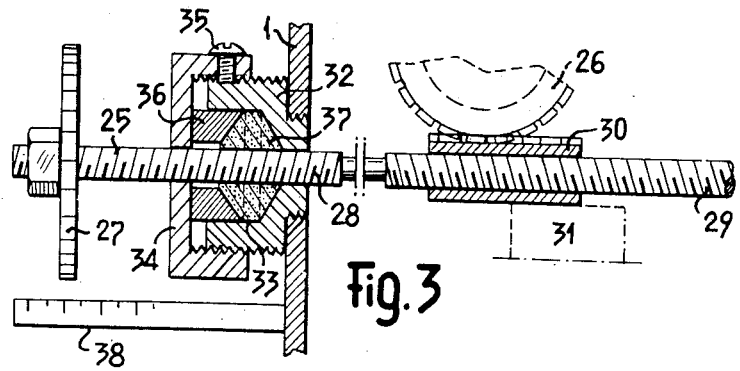
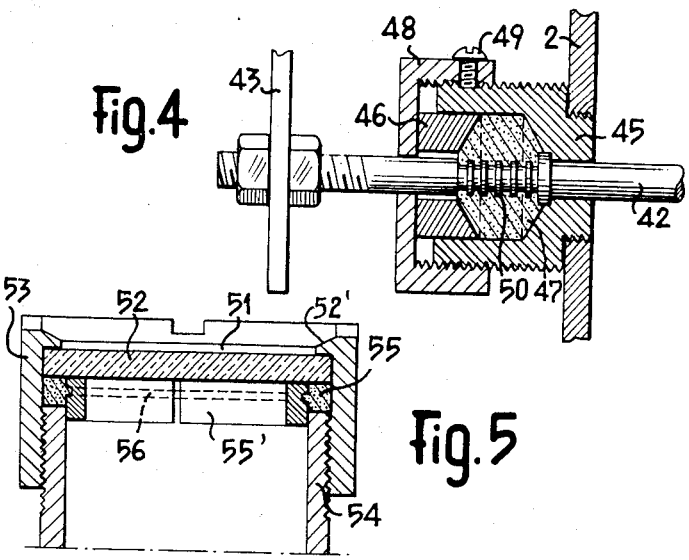
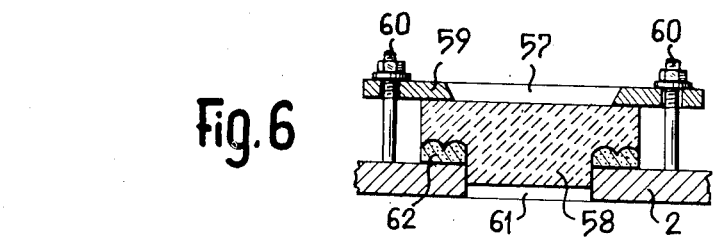

United States Patent Office 2,883,919
Patented Apr. 28, 1959

2,883,919

FLUIDTIGHT CASING FOR VIEW-TAKING CAMERAS

David L. Jayet, La Croix du Sud, Le Trayas, France

Application August 18, 1954, Serial No. 450,685

Claims priority, application Switzerland November 21, 1953

6 Claims. (Cl. 95—11)

My invention has for its object a fluidtight casing for view-taking cameras.

According to a primary feature of my invention, said casing is provided with outwardly convex walls and base and with a cover which is held in its closed position by means of a member of generally U-shape, each of the limbs of the latter being mounted slidably against the action of a spring, said casing being provided with a view finder and with means for ensuring the fluidtightness of the joints of the openings in the casing walls through which the rods controlling the members of the camera extend.

I have illustrated by way of example in accompanying drawings a preferred embodiment of a casing according to my invention. In said drawings:

Fig. 1 is a front view of said casing;

Fig. 2 is a side view thereof;

Fig. 3 is a partial sectional view of a rod adjusting a member of the camera together with the stuffing box carrying said rod;

Fig. 4 is a partial view of a rod controlling the film-winding mechanism and the corresponding stuffing box;

Fig. 5 is a cross-sectional view through the view-taking gate;

Fig. 6 is a cross-sectional view through the gate which allows inspection of the unwinding of the film.

The fluidtight casing illustrated, which has a generally parallelopipedic shape, includes lateral walls 1 and 2, a front wall 3, a rear wall 4, a bottom 5 and a cover 6, said walls and said bottom being outwardly convex so as to provide said casing with a maximum resistance when immersed in water.

The cover 6 is also outwardly convex and it carries in the vicinity of its periphery an inner centering shoulder 7, said shoulder being provided in its outer periphery with a groove 8 in which is fitted a fluidtight packing 9 secured to the shoulder of the cover and adapted to press against the walls of the casing.

The cover 6 is adapted to be urged into position by a member 10 including two depending arms 11 and 12 assembled by a cross-member 13 extending over the cover and carrying a handle 14. Each of the depending arms 11 and 12 includes a metal cylinder 15 inside which a piston 16 is adapted to slide against the action of a spring 17. One of the ends of the rod 18 of each piston is rockably carried by a projection 19 rigid with the outer surface of the lateral walls 1 and 2.

The lateral wall 1 of the casing has mounted on its outer face a finder including a sighting arm 20 located adjacent rear wall 4 and a plate 21 mounted on the side of front wall 3 in front of the sighting arm 20. The plate 21 is made of a suitable colored transparent material and provided with a larger opening 22 for sighting distant objects and a smaller opening 23 for sighting close objects. The latter opening is nearer the axis of the objective lens of the camera carried inside the casing illustrated than the larger opening 22, the axis of the objective lens of said camera registering with that of the glass pane 51 shown in Figs. 1 and 2 and described hereinafter.

The end of the sighting mark 20 is provided with a small sphere 24 which, with the opening 22, defines an axis of sight parallel with the axis of the objective. The corresponding position of the casing makes it possible to photograph an object far removed from the casing. To photograph an object at a short distance, the operator brings sphere 24 and opening 23 in alignment so as to obtain an axis of sight. Thus the position of the casing permits parallax correction. The position of opening 23 corresponds to a distance ordinarily used for close-up photography.

A rod 25 (Fig. 3) extending through the lateral wall 1 of the casing controls inside the latter a toothed wheel 26 forming part of the mechanism for adjusting the diaphragm of the camera while the outer end of the rod 25 carries a control knob 27. The rod 25 is provided with two threads of opposite pitches, 28 and 29. The thread 29 on said rod meshes with a rack 30 adapted to move longitudinally over a guiding member 31 and controlling the rotation of the wheel 26. The other thread 28 on the rod 25 extends inside a stuffing box 33 and engages a nut 32 forming part of the stuffing box 33, which is rigid with the casing wall 1. Said nut 32 carries a threaded cover 34 provided with a pressing screw 35 and adapted to be screwed down over a clamping ring 36 ensuring the compression of the packing 37 of the stuffing box. In registry with the controlling knob 27, the wall 1 carries a rod provided with a scale 38 defining the different openings which may be given to the diaphragm of the camera.

When the knob 27 is caused to turn by one revolution, the longitudinal shifting imparted to the rack 30 is equal to the sum of the pitches of the two threads 28 and 29.

Extending through an opening in the lateral wall 2 of the casing is a rod 39 (Fig. 1) controlling the means for adjusting the position of the camera objective. The rod 39 is similar to the rod 25 and carries a control wheel or knob 40 adapted to move in front of a rod carrying a scale 41 to provide means for defining the position assumed by the objective for any angular position given to the wheel 40.

Also extending through another opening in the lateral wall 2 of the casing is a rod 42 (Figs. 1 and 4) for controlling the film winding mechanism of the camera. The outer end of the rod 42 is rigid with a crank 43 provided with an operating handle 44. Said rod 42 passes axially through a stuffing box comprising a member 45 secured to the wall 2 and inside which is slidingly mounted a ring 46 adapted to compress the packing 47 inside the stuffing box 45. Over the member 45 is screwed a cover 48 engaging the ring 46 through its outer surface, said cover 48 being held in position by a pressure screw 49; the rod 42 is provided inside the stuffing box with collars or baffles 50.

The wall 3 of the casing illustrated is provided with a gate 51 for view-taking purposes, said gate being covered by a glass pane 52 (Fig. 5) held fast in position by means of the inner flange of a tapped sleeve 53 screwed over the threaded end of a tubular part 54 forming part of the casing; an annular fluidtight packing 55 is fitted between said tubular part 54 and the glass pane 52 and engages along its inner periphery the split metal ring 55' the outer periphery of which is grooved at 56 for engagement by said packing ring 55.

The lateral wall 2 is provided with a window 57 through which the unwinding of the film may be inspected, said window 57 being covered by a pane 58 of transparent synthetic material (Fig. 6) held fast by means of a metal frame 59 and of bolts 60 over the corresponding opening 61; the said pane 58 bears against the wall 2 with the interposition of a fluidtight packing 62 provided with two parallel baffles.

The casing illustrated may serve for housing a photographic or kinematographic camera and the shutter release of said camera is obtained by a pusher member 63 secured to a control rod 64 (Figs. 1 and 2) passing through an opening in bottom wall 5 of the casing and acting against the expansion of the spring 65 urging the pusher member back into its inoperative position. A stuffing box similar to that shown in Figures 3 and 4 is secured to the walls 5 where rod 64 enters the casing to ensure fluidtightness at that point.

It is also possible within the scope of my invention to resort to a cylindrical fluidtight casing, the bottom and the cover of which are outwardly convex.

I claim:

1. A parallelepipedal fluidtight casing for housing a conventional camera having a diaphragm, a film control, a shutter release and an objective lens, said casing comprising front, side, back and bottom walls, and an open top through which the camera is inserted into the casing, said walls being of outwardly convex formation to resist water pressure, a removable cover adapted to fit over and seal said top, an annular shoulder depending from the bottom surface of said cover and having a groove in its outer periphery, fluidtight packing means within said groove engaging the upper edge of the front, side and back walls of said casing when said cover is in sealing position, cover securing means comprising a handle, a cover engaging strap secured to said handle, a pair of cylinders depending from said strap at opposite ends thereof, each of said cylinders having a closed bottom end, a piston slidable in each of said cylinders, a rod secured at its upper end to each of said pistons, the lower end of each of said rods extending through an opening in the bottom end of said cylinders, an arm projecting laterally from each side of said casing and providing a pivot to which the lower ends of said rods are secured, resilient means within said cylinder surrounding said rod and confined between the closed end of said cylinder and said piston to normally urge said strap against said cover to ensure a fluidtight engagement between said casing and said cover; fluidtight viewing means mounted externally on the front wall of said casing over an opening therein; finder means mounted on the side and front walls of said casing in a plane parallel to the axis of said viewing means; a diaphragm control rod extending into said casing through an opening in one side wall thereof, a film control rod and an objective lens control rod each extending into said casing through openings on the opposite side wall thereof, a shutter release control rod extending into said casing through an opening in the bottom wall thereof, the inner ends of each of said control rods cooperating with related parts of said camera, fluidtight means mounted on the casing walls at the openings through which each of said control rods pass, said fluidtight means comprising a stuffing box having a side wall with open inner and outer ends and a centrally located chamber, said inner end having a shoulder formed thereon and secured to the casing wall adjacent each of said openings, packing material within said chamber, a clamping ring having a central opening and projecting into the outer open end of said stuffing box to engage said packing material, a cover member also having a central opening and secured over the outer open end of said stuffing box to close the same and compress said ring against said packing material, the openings in said ring and cover being in axial alignment with the open inner end of said stuffing box to receive a control rod passing through said openings and the casing wall to operatively engage a related part of a camera contained within the casing.

2. A fluidtight casing according to claim 1, wherein, said fluidtight viewing means comprises a tubular projection forming part of the front wall of said casing, a sleeve secured to said projection, said sleeve having an internal peripheral flange adjacent its outer end, a glass pane within said sleeve and abutting said flange, an annular packing member also within said sleeve and abutting said pane, an expandable split metal ring engaging said pane and said packing, whereby when said sleeve is secured to said projection a fluidtight connection with the camera casing is provided.

3. A fluidtight casing for cameras according to claim 1, wherein, the fluidtight diaphragm control rod is provided with two threads of opposite pitch, a nut engaging one set of threads of said rod, a rack cooperating with the other set of threads of said rod, and a toothed wheel meshing with said rack.

4. A fluidtight casing for cameras according to claim 1, wherein, the fluidtight film control rod is provided with a series of spaced annular baffles operating in a fluidtight packing.

5. A fluidtight casing for cameras according to claim 1, wherein, said finder means includes a horizontally extending sighting arm mounted on a side wall of the casing adjacent the rear thereof, a transparent plate mounted on the front wall of the casing in line with said sighting arm, said plate provided with two side by side openings lying in the same horizontal plane as said sighting arm, one of said openings being of larger diameter than the other, the larger of said openings being used for sighting distant objects and the smaller opening being used for sighting close objects.

6. A fluidtight casing according to claim 1 wherein, said diaphragm and objective lens control rods are each axially movable and are each provided with a knob at their outer ends, a graduated scale arm projecting laterally from the same side wall through which said rods pass and in substantially vertical alignment therewith, whereby the position of said knob in relation to said scale provides means for determining the correct adjustment of the relative camera part controlled by said rod.

References Cited in the file of this patent

UNITED STATES PATENTS

| 685,463 | Walkins | Oct. 29, 1901 |
| 2,487,868 | Grigsby | Nov. 15, 1949 |
| 2,573,885 | Whitman et al. | Nov. 6, 1951 |
| 2,661,974 | Zehnder | Dec. 8, 1953 |

FOREIGN PATENTS

| 1,019,148 | France | May 27, 1950 |

OTHER REFERENCES

Cross: text, "Underwater Photography and Television," February 21, 1954, published by Exposition Press, New York. The 6 unnumbered sheets containing Figs. 10–19, between pages 66 and 67 are cited.

Collins: "American Cinematographer," vol. 31, No. 8, August 1950, page 274.